J. C. KOPF.
SPIRAL GEAR CUTTING MACHINE.
APPLICATION FILED NOV. 28, 1919.

1,361,161.

Patented Dec. 7, 1920.
12 SHEETS—SHEET 1.

Fig.1.

INVENTOR
ATTORNEY

J. C. KOPF.
SPIRAL GEAR CUTTING MACHINE.
APPLICATION FILED NOV. 28, 1919.

1,361,161.

Patented Dec. 7, 1920.
12 SHEETS—SHEET 2.

J. C. KOPF.
SPIRAL GEAR CUTTING MACHINE.
APPLICATION FILED NOV. 28, 1919.

1,361,161.

Patented Dec. 7, 1920.
12 SHEETS—SHEET 4.

Fig.4.

INVENTOR
John C. Kopf
BY
ATTORNEY

J. C. KOPF.
SPIRAL GEAR CUTTING MACHINE.
APPLICATION FILED NOV. 28, 1919.

1,361,161.

Patented Dec. 7, 1920.
12 SHEETS—SHEET 8.

J. C. KOPF.
SPIRAL GEAR CUTTING MACHINE.
APPLICATION FILED NOV. 28, 1919.

1,361,161.

Patented Dec. 7, 1920.
12 SHEETS—SHEET 11.

J. C. KOPF.
SPIRAL GEAR CUTTING MACHINE.
APPLICATION FILED NOV. 28, 1919.

1,361,161.

Patented Dec. 7, 1920.
12 SHEETS—SHEET 12.

UNITED STATES PATENT OFFICE.

JOHN C. KOPF, OF BELLEVUE BOROUGH, PENNSYLVANIA, ASSIGNOR TO THE DUFF MANUFACTURING COMPANY, OF PITTSBURGH, PENNSYLVANIA, A CORPORATION OF PENNSYLVANIA.

SPIRAL-GEAR-CUTTING MACHINE.

1,361,161.  Specification of Letters Patent.  Patented Dec. 7, 1920.

Application filed November 28, 1919. Serial No. 341,208.

*To all whom it may concern:*

Be it known that I, JOHN C. KOPF, a citizen of the United States, and resident of the borough of Bellevue, in the county of Allegheny and State of Pennsylvania, have invented a new and useful Spiral-Gear-Cutting Machine, of which the following is a specification.

In my Patent, No. 1,318,770, dated October 14, 1919, I have disclosed a mechanical movement comprising a double conical spiral pinion meshing with a pair of buttress-toothed gears, each continuous working face of the pinion comprising a plurality of convolutions of constantly varying major spiral pitch, constantly varying minor helical pitch, and constantly varying working face angle, the action being substantially perpendicular to the driving axis and involving line contact. In another Patent, No. 1,343,396, dated June 15, 1920, I have disclosed a method and machine for economically cutting such pinions with their two sides in exact symmetry. The present invention comprises a method and machine whereby such pinions or gears are cut in accordance with a different principle. In my said application the blank is rotated between and against the cutting edges of the faces of a pair of buttress-toothed disks lying in the plane of the axis of the blank, said faces being shaped and proportioned similarly to the gears with which the pinion is to mesh and being rotated slowly in opposite directions in predetermined ratio to the rotation of the blank, that is to say the ratio of the intended gearing, while relative feed movement is produced between the blank and the cutters, causing their axes to approach. In this manner the cutting in each half of the blank proceeds simultaneously from a plurality of points and the working face is cut over and over until the required depth is attained. Under the method herein set forth, the blank is rotated and the working face is cut full depth from a single point, by the rapidly repeated action of successive cutting edges acting in planes intersecting the axis of the blank, the cutting region being displaced angularly in the plane of the axis of the blank in predetermined ratio to the rotation thereof. More specifically, the blank is rotated in laterally projecting relation centrally opposite a pair of multiple-edged circular-cutting wheels having their axes in a plane with the axis of the blank, which wheels are rapidly rotated and simultaneously slowly swung about perpendicular axes, so as to encounter and work sidewise through the rotating breasts of the blank, thereby producing the spiral working faces of constantly varying pitches and angle as stated. The preferred embodiment of the machine herein disclosed for carrying out this method comprises means, such as head and tail stocks, for rotatably supporting the blank, twin cutter heads mounted to turn on parallel axes to one side of the axis of the blank support and perpendicular to the plane thereof, cutting wheels mounted to rotate on transverse axes on said cutter heads and having their cutting regions transversely of buttress outline, common driving means and timed trains of connections for rotating the blank and turning the cutter heads in predetermined ratio, and means for rapidly rotating the cutters at equal speeds while slowly turning with the heads. The cut is finished when the blank has turned as many times as there are convolutions to be formed in the spiral, at which time the cutter-heads have turned much more slowly through a comparatively short arc of movement. In order to avoid the loss of time which would result from waiting for the slowly-moving cutter-heads to turn all the way around to arrive at the starting position for cutting a fresh blank, means are provided for starting and stopping the heads and reversing and accelerating their movement, so that after a blank has been cut and taken out, they can be turned quickly back through the short arc through which they have moved. While the method and machine are particularly advantageous for cutting double spiral pinions and gears, because of the possibility of forming the two sides in perfect balance, the invention is not necessarily so limited.

In the accompanying drawings forming a part hereof.

Figure 2:
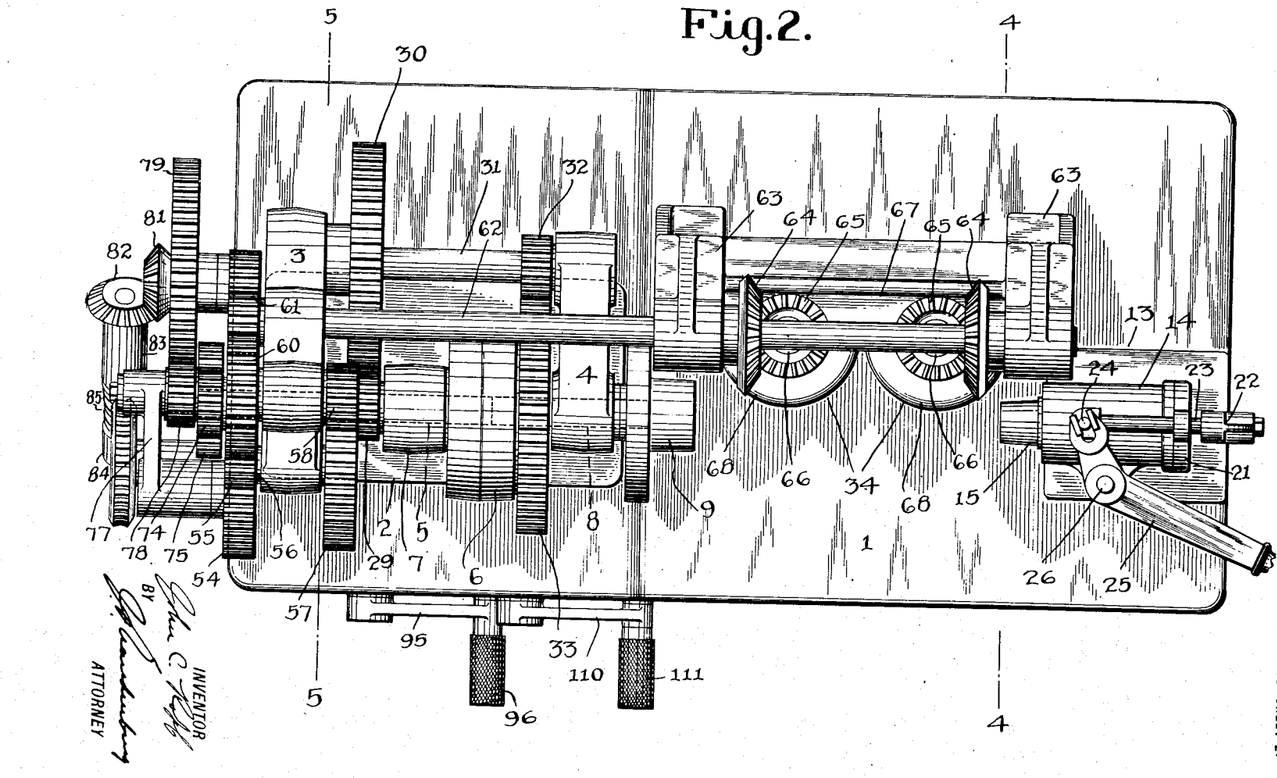
Fig. 2 is a plan view.
Figure 3:
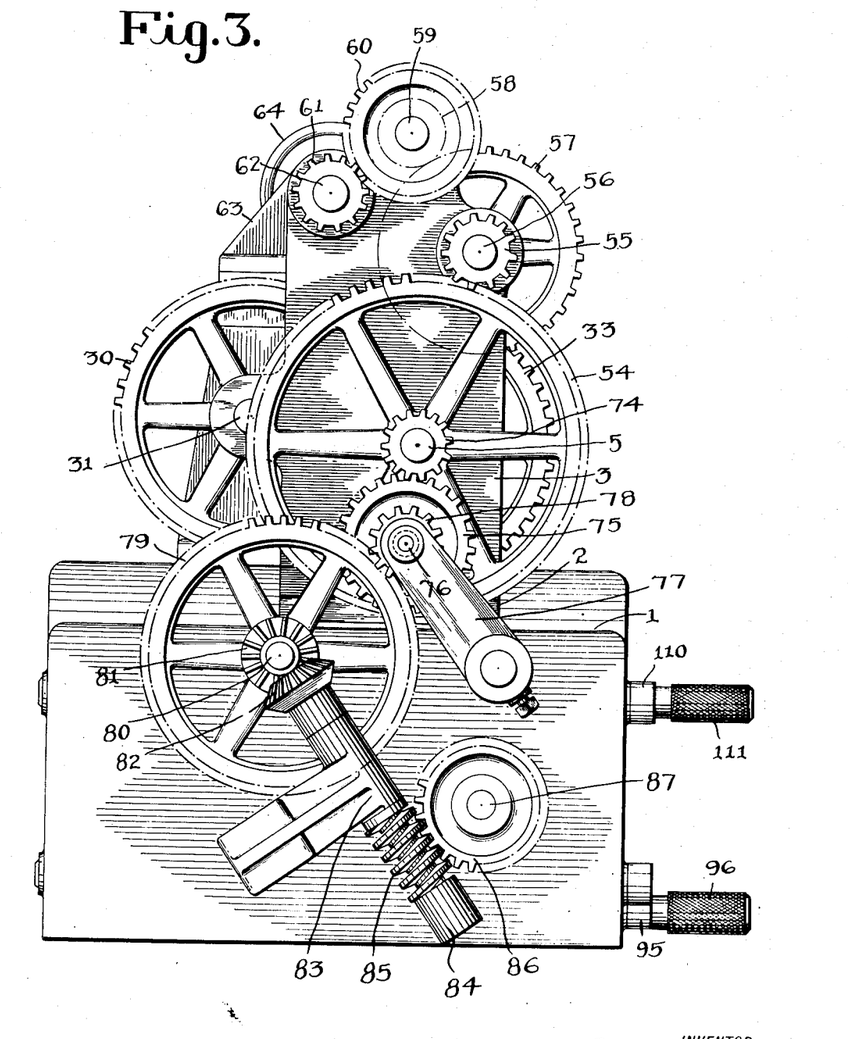
Fig. 3 is an end elevation.
Figure 4:
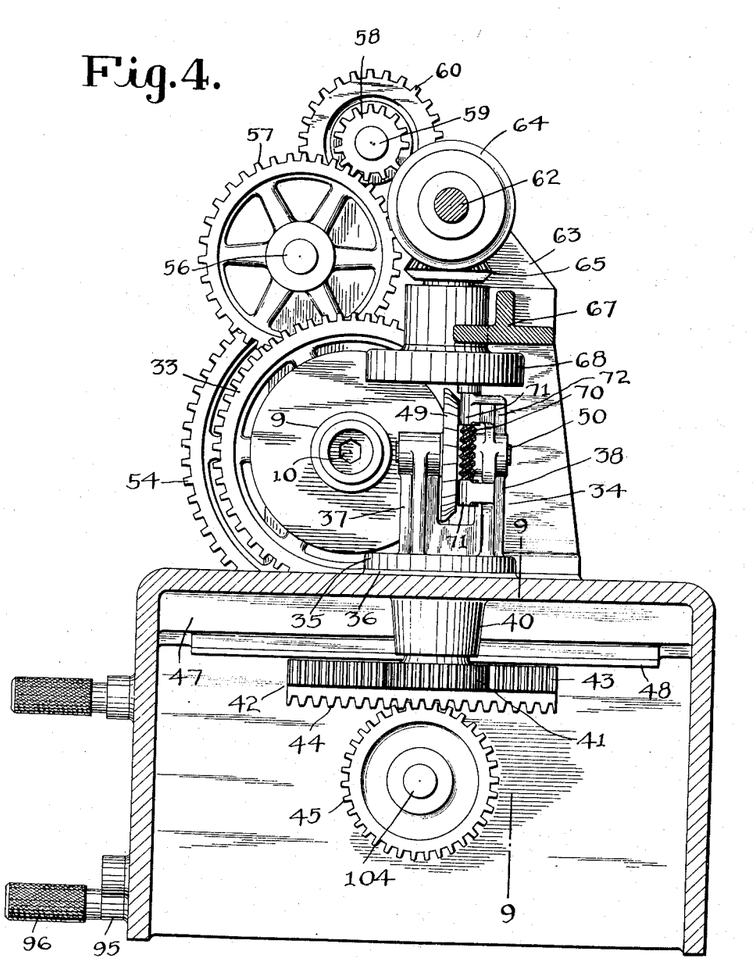
Fig. 4 is a vertical section on the line 4—4 of Fig. 2.
Figure 5:
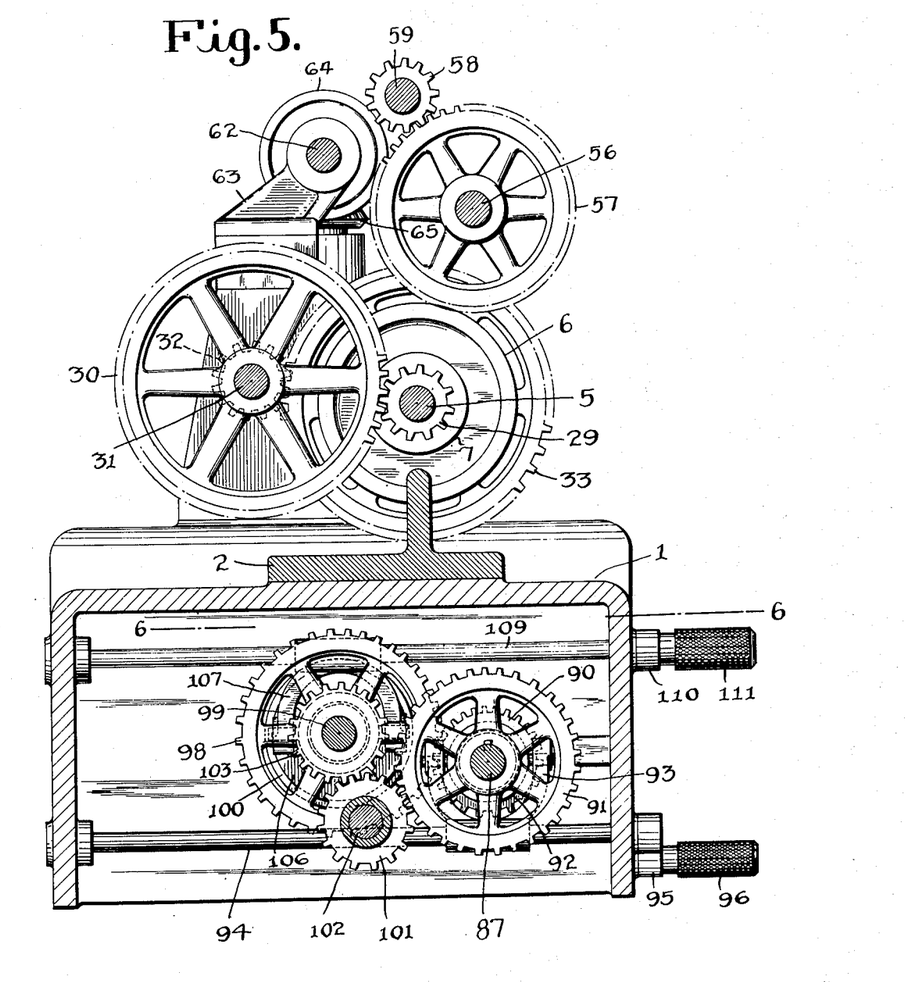
Fig. 5 is a vertical section on the line 5—5 of Fig. 2.
Figure 6:
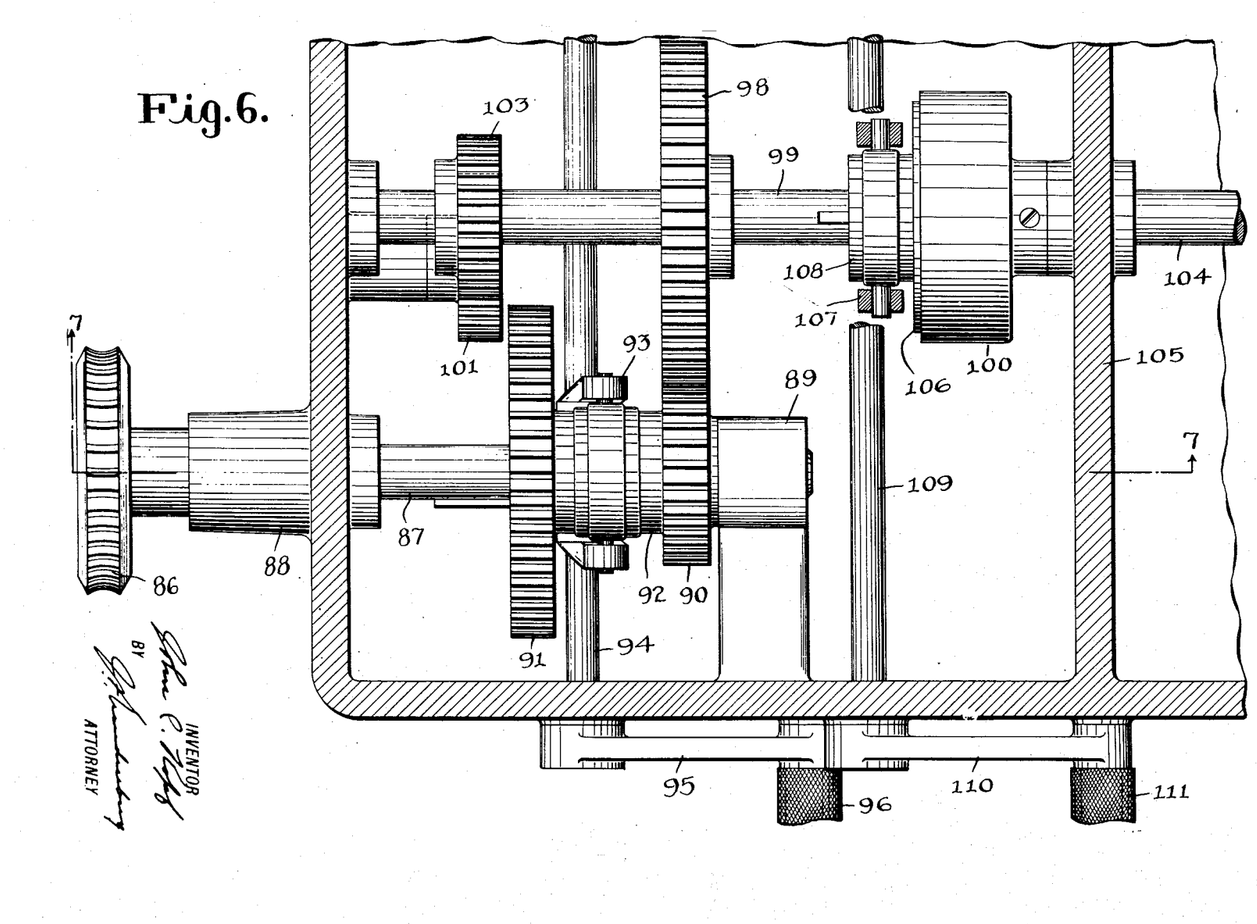
Fig. 6 is an enlarged horizontal section on the line 6—6 of Fig. 5.
Figure 7:
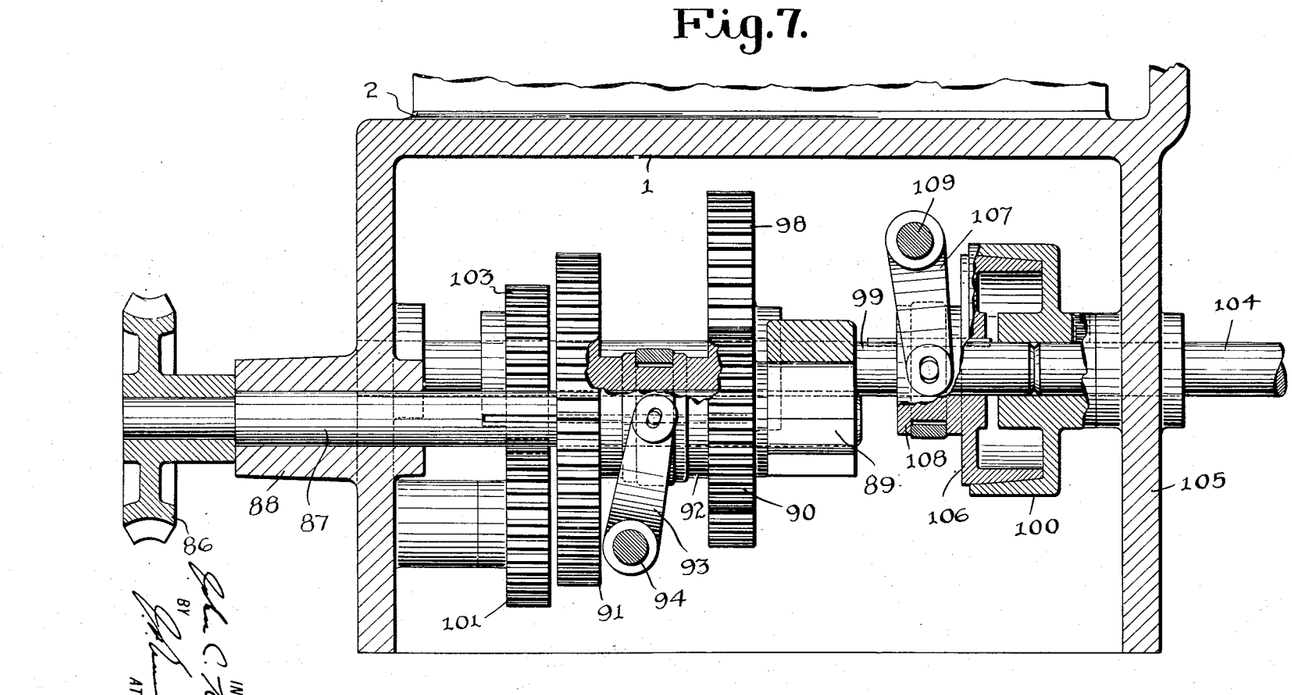
Fig. 7 is a vertical longitudinal section on the line 7—7 of Fig. 6.
Figure 8:
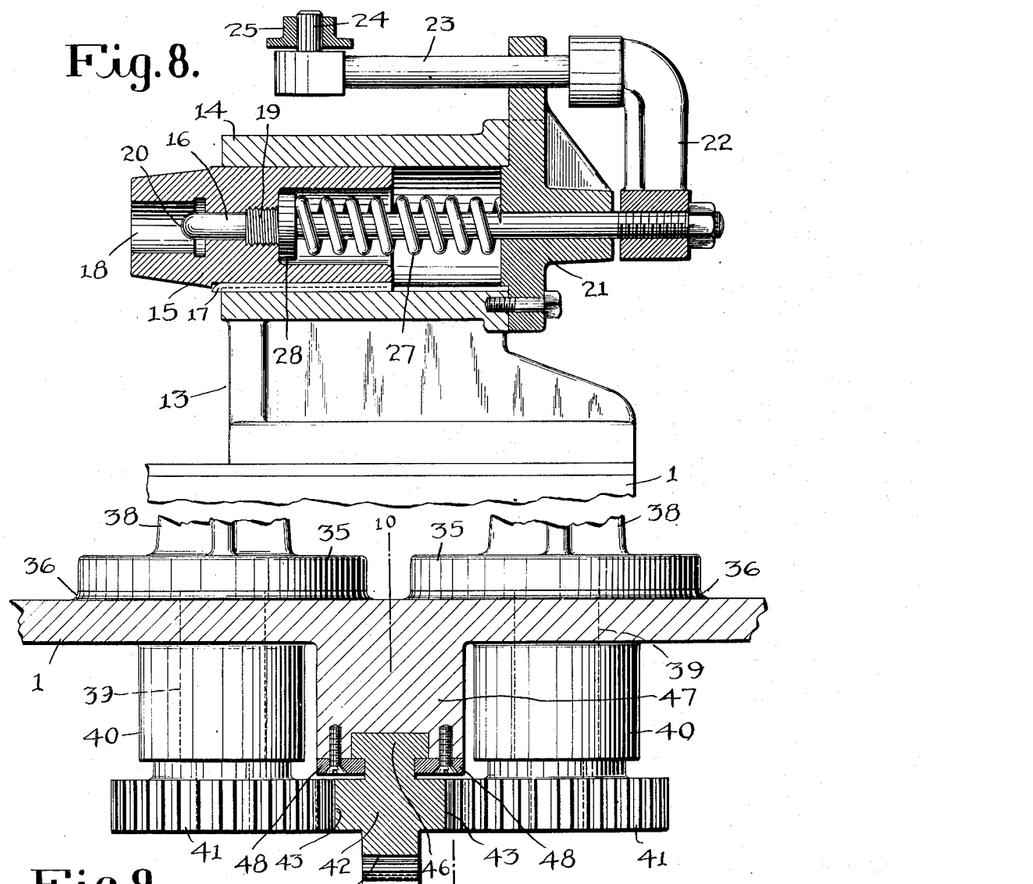
Fig. 8 is an enlarged vertical longitudinal section through the tail stock.

The machine has a bed frame 1, at one end of which is a gear-stand 2 having uprights 3, 4. A shaft 5 is journaled in the upright 3 and carries large and small pulleys 6 and 7 at the inner side thereof. Power is received by either of these pulleys for driving the coöperative mechanisms of the machine. The upright 4 constitutes a head stock containing a live spindle or shaft 8 bearing a chuck 9, which is formed with the polygonal socket 10 seen in Fig. 4, to receive a corresponding formation on one end of the shaft 11 of the blank 12. The live spindle 8 is preferably in line with the primary driving shaft 5, though not directly connected therewith, and projects within the pulley 6, as seen in Fig. 2, to afford additional support.

At the far end of the bed is a tail stock 13, bearing a horizontal tubular housing 14 containing a slidable socket member 15 and center rod 16. The socket member is connected by a key 17 with the interior of the housing 14, so as to be slidable therein without turning, and in its inner end is a cylindrical socket 18 in which the circular end of the blank shaft is free to turn. The center rod 16 is screwed at 19 within the socket member, and has a rounded end 20 projecting into the back of the socket 18 to afford an end bearing for the blank shaft. The rod passes in the opposite direction axially through the housing 14 and through a slide bearing in a back plate 21, in rear of which it bears an angular arm 22, which in turn carries an upper rod 23 slidable in an opening in an upward projection of the plate 21. On the free end of said rod 23 is a vertical pin 24 engaged by the forked end of a hand-lever 25, which is fulcrumed on a vertical pivot 26 on the forward portion of the tail stock. By means of this lever the socket member 15 can be retracted into the housing 14 against the pressure of a spring 27, to permit the insertion and removal of the blanks. Said spring is contained within the housing in a chamber in the rear part of the member 15, and bears at its opposite ends against the back plate 21 and a collar 28 on the rod 16.

The live spindle and chuck of the blank support thus constituted are driven from the shaft 5 through a timed speed-reducing gear train, comprising a pinion 29 on the shaft 5 at the inner side of the standard 3, a large gear 30 meshing the said pinion and fixed on a countershaft 31 at the back journaled at its ends in bearings in the uprights 3 and 4, a pinion 32 on said countershaft, and a large gear 33 meshed by said pinion and fast on the live spindle 8.

Figure 9:
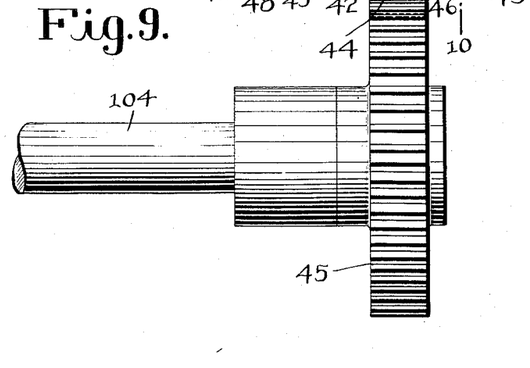
Fig. 9 is an enlarged vertical longitudinal section on the line 9—9 of Fig. 4.
Figure 10:
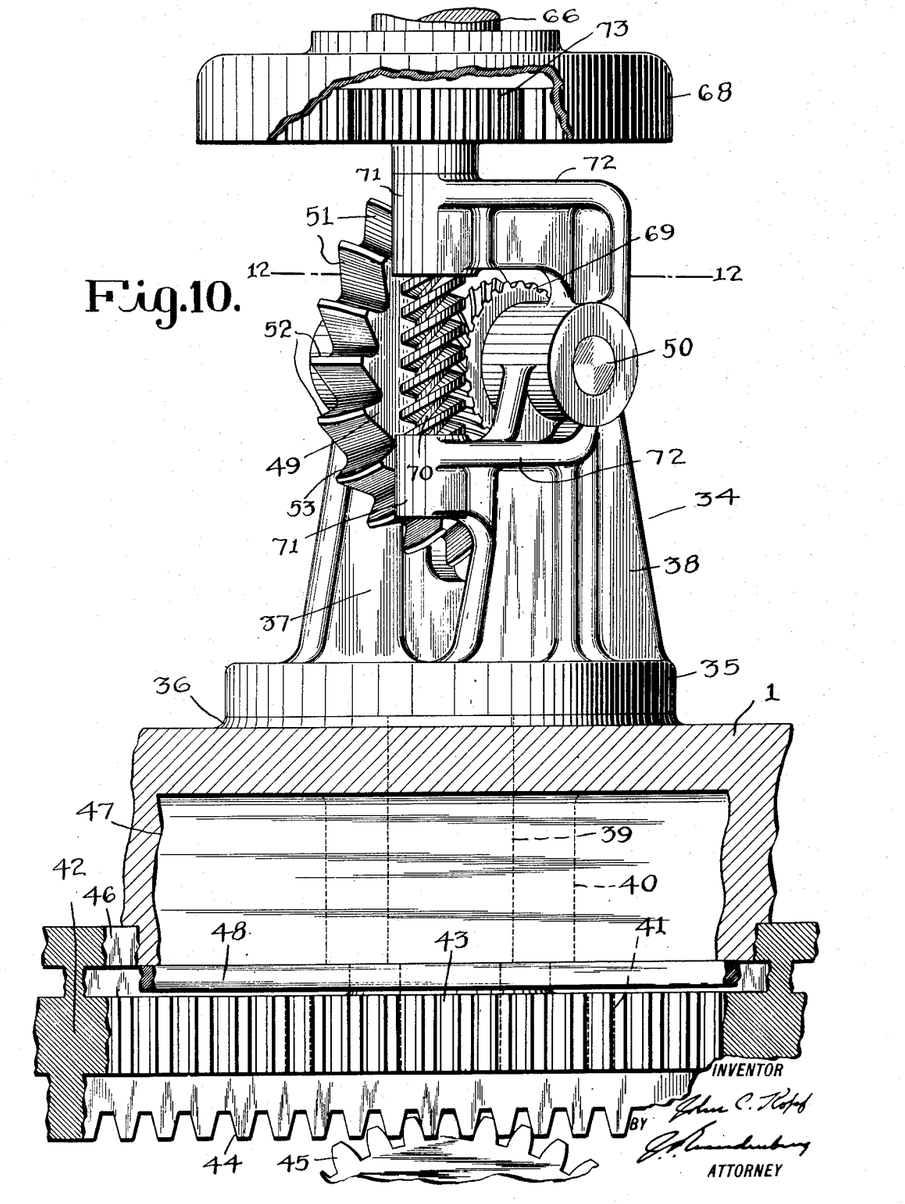
Fig. 10 is an enlarged fragmentary vertical section on the line 10—10 of Fig. 9, showing one of the cutter-heads in elevation and the driving cap for its cutter partly broken away.

Rearwardly of the head and tail stocks and opposite the space between them where the blank is supported and rotated in operation, are twin cutter-heads 34. Said cutter-heads are mounted to turn on vertical axes, that is to say axes parallel with each other to one side of and equally distant from the axis of the blank support and perpendicular to the plane of said axis. Each cutter-head is preferably constructed with a circular base 35 having wide bearing upon a boss 36 on the bed, uprights 37 and 38, and a downwardly-extending journal 39 passing through a bearing 40 in the top of the bed and bearing a pinion 41 on its lower end. The two pinions 41 are disposed in transverse alinement with sufficient space between them to accommodate a triple rack bar 42, which is slidable forwardly and rearwardly beneath the top. Said rack bar has rack teeth 43 upon its opposite sides to mesh with the pinions 41, and another series of teeth 44 on the bottom for engagement by a gear 45. The top of the bar is formed with a T-rib 46, whereby it is guided and supported in an undercut channel formed in an under rib 47 of the bed top and completed by retaining strips 48 screwed to the bottom of said rib, as seen in Figs. 9 and 10.

Each of the cutter-heads carries a vertical cutter wheel 49, which is fixed to the intermediate portion of a shaft 50 journaled at its ends in bearings in the uprights 37 and 38. The axes of the cutter shafts lie in the same horizontal plane with the axis of the blank support, and therefore of the blank. The cutter wheels are provided with series of cutting edges, whereby they act upon the blank by rapidly repeated circular-cutting action. In the particular construction shown the cutters have peripherally projecting teeth 51, the shape of which in the circumferential direction is immaterial, though it is preferable to have them of general buttress form in sections perpendicular to the axis of revolution for purposes of strength. Transversely of the wheel, however, the cutting regions are arranged in conformity to the circumferential buttress formation of the teeth of the gears $b$ (Fig. 13), with which the completed pinion is to mesh. That is to say, with cutters formed as illustrated, the outer ends of the teeth 51 are beveled or inclined with reference to the axis of the wheel, and the cutting edges are formed at the forward transversely oblique corners 52 of these beveled ends and at the forward corners 53 at one side of the disk which is in acute angular relation to the edges 52 (see Fig. 10). Edges in similar cutting arrangement, to produce what I shall term a buttress cut, can be formed upon the wheels in specifically different ways, the general relation being that graphically illustrated in Fig. 13. The wheels are mounted in such positions upon the cutter-heads 34 that the vertical axes of rotation of the heads are in line with the vertical diameters of the faces or lateral planes of the wheels 49 which contain the cutting edges 53, these being the edges which correspond to the radial working faces of the buttress teeth $c$ of the gears $b$.

The cutter-wheels are driven by a speed-multiplying train partly on the fixed frame of the machine and partly on the rotating cutter-heads. Starting from the main driving shaft 5, the part of the train on the frame may be traced as follows: Large gear 54 on shaft 5 outside of the standard 3, pinion or small gear 55 on the end of a countershaft 56 passing through a bearing in the standard, large gear 57 on said shaft at the inner side of the standard meshing with pinion 58 on another countershaft 59, large gear 60 on this shaft outside the standard meshing with small gear 61 on a shaft 62, said shaft extending inwardly over the top of the machine and having bearings in the standard 3 and in standards 63 rising at opposite sides of the cutter-heads, reversed bevel gears 64 on said shaft between the standards 63, bevel pinions 65 meshed by said gears and secured to the upper ends of vertical shafts 66 passing through a crosspiece 67, and internal gear caps 68 on the lower ends of said shafts over the cutter-heads. On the cutter-heads each of the cutter-shafts 50 carries a worm wheel 69, which is meshed by a vertical worm 70 having upper and lower journal portions in bearings 71 on yoke arms 72 of the standard 38. Pinions 73 are fixed to the upper journal portions of said worms, above the standards 38, and mesh with the teeth of the oppositely rotating internal driving gear elements 68 in all positions of rotation of the cutter-heads, the internal gears being concentric with the axes of the heads. In this way the cutter wheels are rapidly rotated at equal speeds while slowly swinging laterally about their vertical diameters, due to the turning of the heads. The driving gear elements 68 are coaxial with the cutter-heads, and elements 73 on the heads driven by the elements 68 are eccentric to the axes of the heads.

The cutter-heads 34 are turned at equal slow speed in opposite directions in predetermined ratio to the rotation of the blank. To this end they are connected with the common source of power by a gear train designed to effect a speed reduction substantially greater than that of the train which drives the blank. Said train includes the following elements: Pinion 74 on drive shaft 5 outside of the upright 3, gear 75 on a shaft 76 mounted on an arm 77, small pinion gear 78 united with the gear 75 and meshing with large gear 79 on a shaft 80, bevel pinion 81 united with the gear 79 and meshing with a bevel pinion 82 on the upper end of a diagonal shaft journaled in bearing brackets 83, 84, and a worm 85 on the lower portion of said shaft meshing with a worm wheel 86 on a shaft 87 which passes through a bearing 88 in the end wall of the bed and across to a bearing 89 in the interior thereof.

Slidably splined on the shaft 87 are low and high speed forward and reverse driving gears 90 and 91 united by a shifter hub 92. Said hub is embraced by a shifter fork 93 fixed on a fore and aft rock-shaft 94, which bears a hand-lever 95 at the front of the bed with a familiar locking pin, not shown, operable by the handle 96 to engage with sockets in a boss 97 to hold the reversing gearing in either forward or reversed position. In the forward position the smaller gear 90 meshes with a large gear 98 on a shaft 99, which extends across the interior of the bed with bearings in the end wall and in the interior of a fixed clutch member 100. In the reversing position the smaller driving gear 90 is out of mesh with the large driven gear 98, and the larger driving gear 91 is brought into mesh with an idle gear 101 on a stud shaft 102, said idler meshing at all times with a small gear 103 on the shaft 99. The fixed clutch member 100 is secured on the end of a shaft 104 adjacent the bearing of the latter in an interior wall 105. Said shaft 104 extends beyond the wall 105, and bears the pinion 45, heretofore referred to as being in driving engagement with the bottom teeth of the triple rack 42, whereby the cutter-heads are turned in opposite directions. Driving connection from the shaft 99 to the shaft 104 is established and broken by means of a movable clutch member 106 slidably keyed to the shaft 99 for movement into and out of coupled relation with the fixed clutch member 100. The movable clutch member is operated by a shifter fork 107 embracing its hub 108, said fork being on a fore and aft rock-shaft 109 extending outwardly through the front of the bed and bearing a hand-lever 110 having a handle 111 with locking pin coöperating with a locking boss 112.

Figure 13:
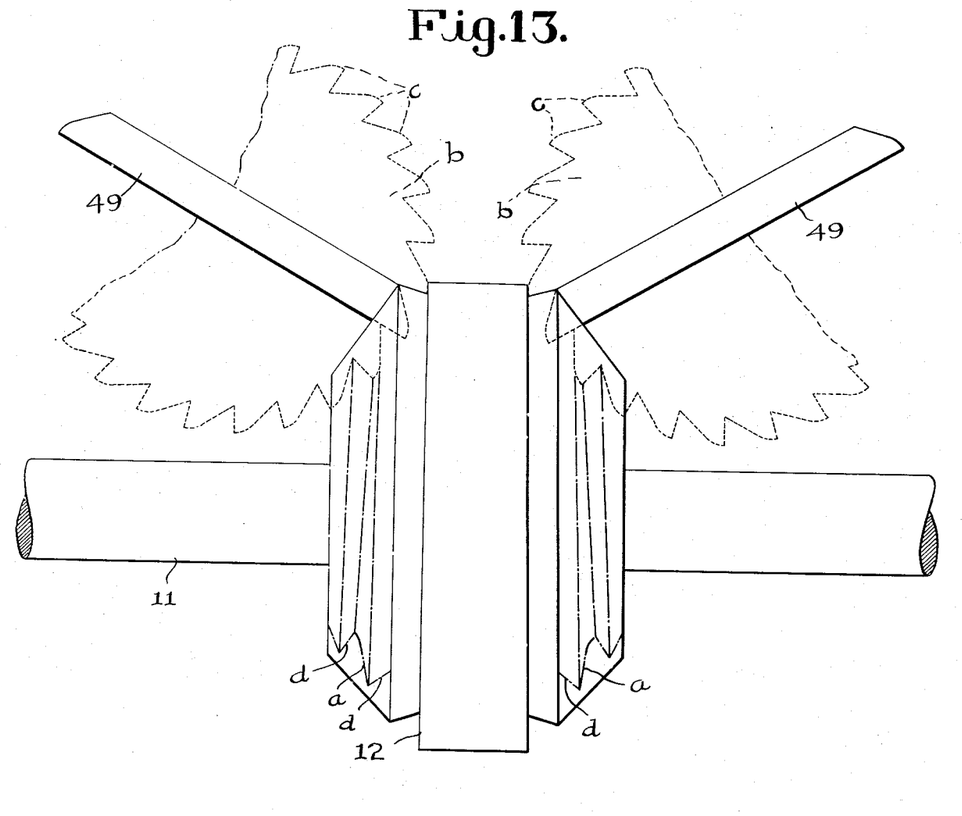
Fig. 13 is a diagrammatic view.

In the forward driving condition, the last described train of connections leading from the shaft 5 to the cutter-heads and including the gears 90 and 98 is so timed in its several parts as to turn the heads at a ratio to the rotation of the blank driven by its timed train which is the same as the ratio between the elements of the gearing desired, that is to say between the gears $b$ of Fig. 13 and the finished spiral pinion $a$. When the cutter-head-drive is reversed, however, bringing the gears 91, 101 into mesh, the speed of rotation of the cutter-heads in the reverse direction is much faster, in order to enable the heads to return quickly to a starting position.

Figure 1:
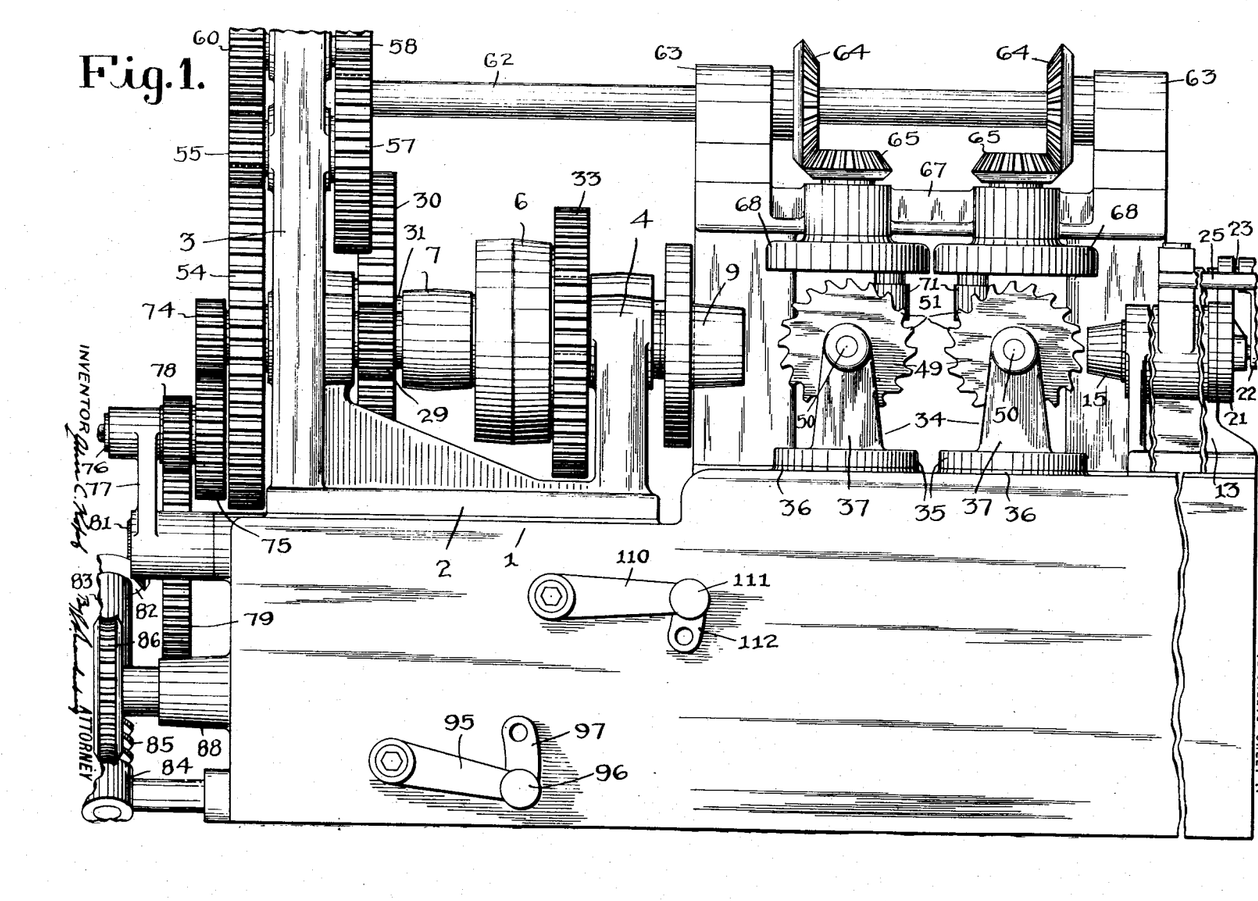
Figure 1 is a front elevation of the machine, with parts at the right-hand end broken away and contracted and showing the cutting wheels for clearness in full face view.
Figure 11:
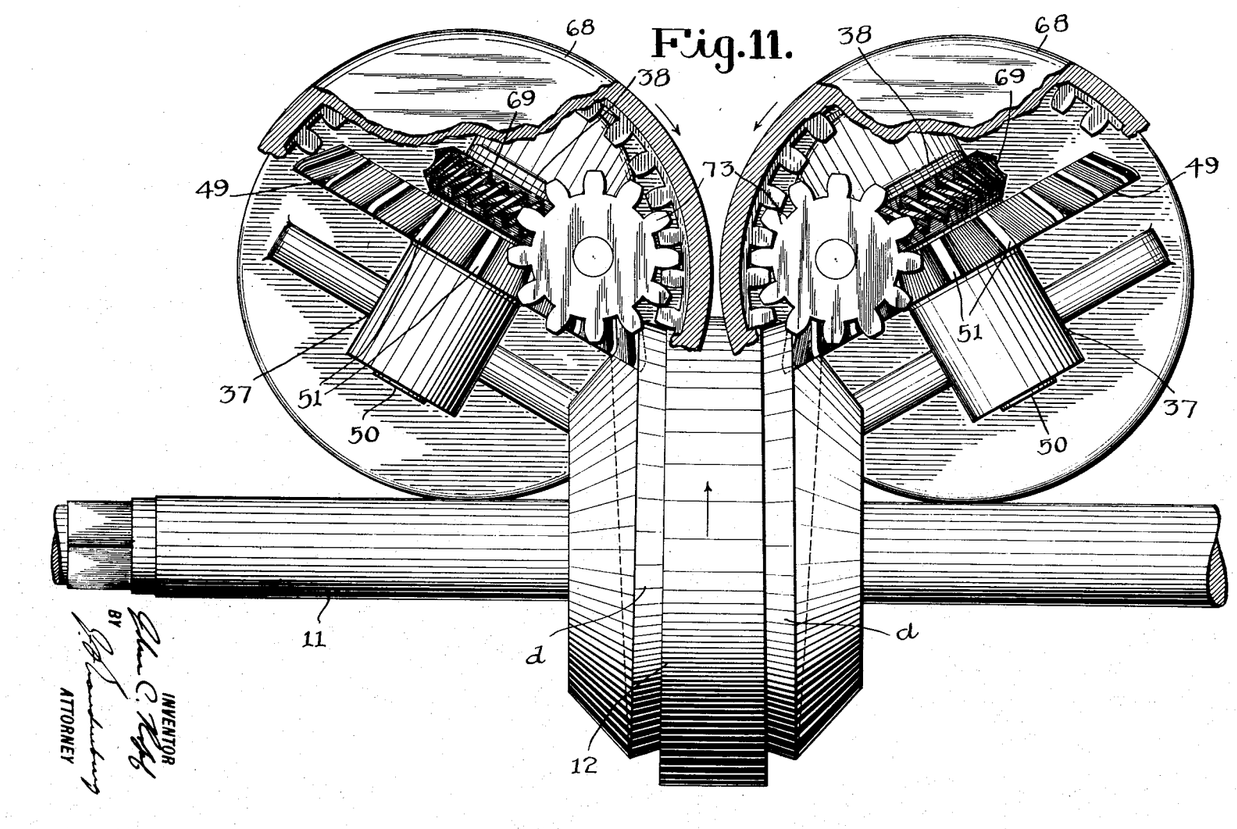
Fig. 11 is a plan view of the cutter-heads and blank with the driving caps of the cutter-heads broken away and showing an early stage of the cutting.

The operation will now be briefly described. A blank 12 or roughly formed pinion laterally projecting from a shaft 11 to which it may be permanently united, is introduced in laterally projecting relation in front of the cutter-wheels 49, which may then be substantially in the positions shown in Fig. 1, that is to say with their sides containing the cutting edges 53 facing forward and the working regions at substantially their closest degree of approach to each other. Said working regions are the peripheral regions in the horizontal plane of the axes of the cutters and blank which are presented to the blank. The plain end of the blank shaft is first inserted in the socket member 15 of the tail stock, which at this time is retracted by means of the hand lever 25, and the polygonal end is then brought opposite the socket in the chuck 9 and the lever released, so that the polygonal end seats itself in driving engagement with the socket in the chuck. The blank is thus rotated in a fixed position, where its portions at opposite sides of its central transverse plane will be encountered by the working regions of the cutters when the latter are slowly swung in the directions of the arrows (Fig. 11) by the turning of the cutter-heads. The cutters are rapidly rotating, but the heads are stationary at the moment, owing to the clutch controlled by the handle 111 being out. The handle 95 of the reversing mechanism is in the forward position, and consequently when the clutch is thrown in the cutter-heads are rotated in opposite directions, as indicated, bringing first their side edges 53 and then their peripheral edges 52 into engagement with the outermost portion of the blank. The formation of the twin spiral working faces $d$ is thus started at their outer ends and progresses as the blank and cutter-heads turn about their centers at their respective higher and lower speeds. The turning of the cutter-heads displaces the cutting regions in arcs in the plane of the axis of the blank, causing the cutting edges both to approach said axis and to move lengthwise thereof, the rates of movement in the two rectangular directions being constantly varying, and thus producing the varying spiral and helical pitches of the working face $d$. Furthermore, the arcs are such that the component of transverse displacement exceeds the component of axial displacement. The angular relations of the faces of the cutters containing the cutting edges 53 to the axis of the blank also vary with the turning of the cutter-heads, and consequently result in a constantly varying working face angle in the gear being cut.

Figure 12:
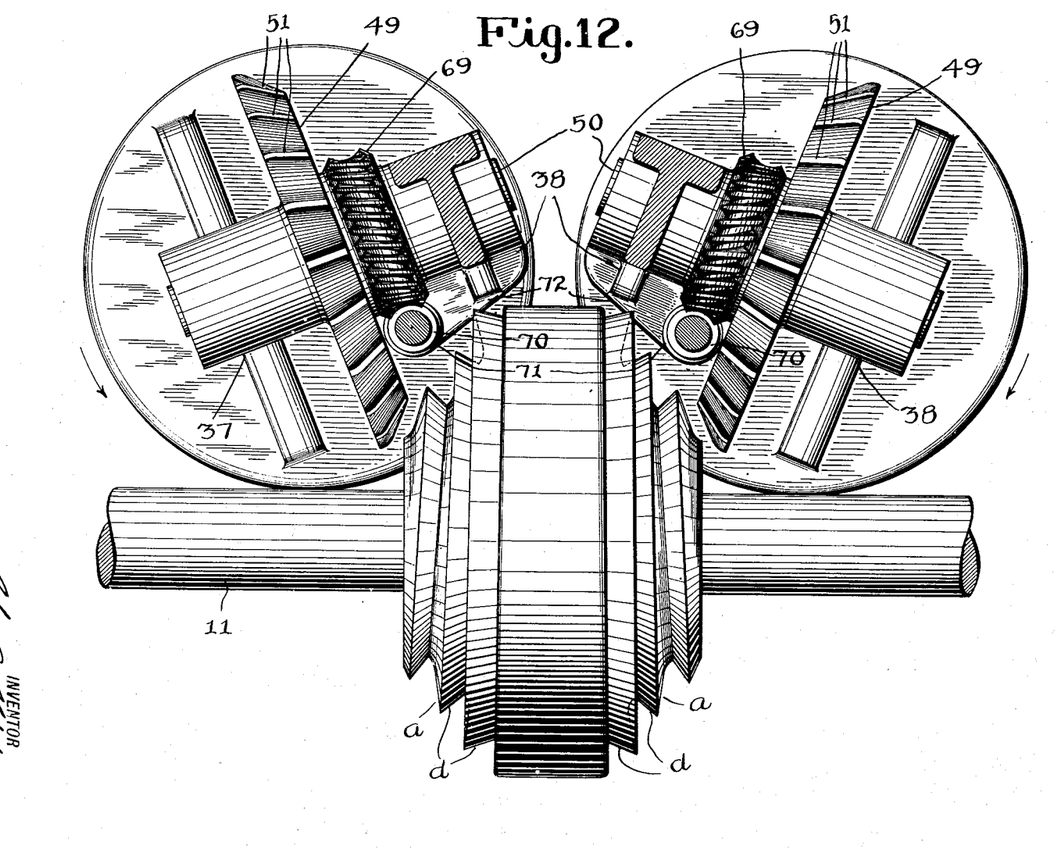
Fig. 12 is a horizontal section through both cutter-heads on the line 12—12 of Fig. 10, showing the cutter wheels in elevation and illustrating the condition at the conclusion of the cutting operation.

The blank is made of sufficient width in the axial direction to contain a plurality of convolutions of the spiral working face, so that the finished pinion will have driving engagement simultaneously with a plurality of buttress teeth $c$ on the gears $b$ (Fig. 13) adjacent and below the diametrical plane which is parallel with the axis of the driver. The circular-cutting wheels form the working face full depth in the first instance, and consequently the pinion is cut when it has made as many revolutions as there are convolutions to be formed. During the operation the cutter-heads turn through a fraction of a revolution, approximately from the positions of Fig. 11 to the positions of Fig. 12. When the turning of the heads has carried the cutters sufficiently beyond the finished gear to permit the removal of the latter in safety, the operator moves the clutch handle 110 to throw out the clutch and stop the movement of the heads. The shaft 11 of the cut gear is then withdrawn from the head and tail stocks. Next the attendant operates the reverse lever 95, which causes the shaft 99 to rotate in the reverse direction at relatively high speed. The clutch lever 110 is again operated to throw in the clutch and the cutter-heads are then turned quickly backward through their arc of movement to the starting position, the directions of movement in this operation being represented by the arrows of Fig. 12. The clutch is again thrown out, arresting the heads in this position, a fresh blank is inserted, the reversing lever 95 is moved to restore the reversing mechanism to its normal condition for forward driving of the heads, and the clutch is once more thrown in, whereupon the cycle of operations is repeated.

What I claim as new is:

1. The method of cutting a double spiral pinion of the character described, which comprises rotating a blank in laterally projecting relation centrally opposite two rapidly rotating multiple-edged cutters acting in planes intersecting the axis of the blank, and simultaneously slowly swinging said cutters in predetermined ratio to the rotation thereof.

2. The method of cutting a double spiral pinion of the character described, which comprises rotating a blank in laterally projecting relation centrally opposite two rapidly rotating multiple-edged cutters acting in planes intersecting the axis of the blank, and simultaneously slowly swinging said cutters in opposite directions in predetermined ratio to the rotation thereof.

3. The method of cutting a double spiral pinion of the character described, which comprises rotating a blank, and acting upon the same at one side of its axis and at opposite sides of the central transverse plane with rapidly moving series of cutting edges acting in planes intersecting the axis of the blank, while displacing the two cutting regions both transversely and lengthwise with respect to said axis through arcs in which the component of transverse displacement exceeds the longitudinal component.

4. The method of cutting a spiral pinion of the character described, which comprises rotating a blank, rapidly rotating a multiple-edged cutter and slowly swinging the acting region in the periphery of the cutter in cutting engagement with the side of the rotating blank in an arc whereof the component of displacement transversely of the axis of the blank exceeds the longitudinal component.

5. The method of cutting a gear having a continuous working face varying in pitch both spirally and helically and of varying angle, which comprises rotating a blank, and progressively forming the working face in the rotating blank by circular cutting action of successive edges at a region at one side of the axis of the blank, while angularly displacing said region of cutting in predetermined ratio to the rotation of the blank.

6. A machine of the character described, comprising means for rotatably supporting a blank, twin cutter-heads mounted to turn about parallel axes to one side of the axis of the blank and perpendicular thereto, circular-cutting wheels on said heads rotating on axes transverse to the axes of the heads to act upon the blank between them, driving means and timed gearings for rotating the blank and simultaneously turning the cutter-heads at equal relatively slow speed, and means for also rapidly rotating the cutting wheels about their axes as they turn with the cutter heads.

7. A machine of the character described, comprising means for rotatably supporting a blank, twin circular-cutting wheels at one side of the axis of the blank arranged to act upon the blank between them in angularly shifting planes intersecting said axis, driving means and mechanism for rotating the blank and for simultaneously and equally swinging the wheels, in predetermined timed relation, and means for simultaneously rotating the cutting wheels about their own axes.

8. A machine of the character described, comprising means for rotatably supporting a blank, twin circular-cutting wheels at one side of the axis of the blank arranged to act upon the blank between them, the axes of said wheels lying in a plane with the axis of the blank, driving means and mechanism for rotating the blank and for equally and in predetermined timed relation to the rotation of the blank swinging the wheels about axes parallel with each other and perpendicular to the said plane, and means for simultaneously rotating the cutting wheels about their own axes.

9. A machine of the character described, comprising means for rotatably supporting a blank, twin circular-cutting wheels at one side of the axis of the blank arranged to act upon the blank between them, the axes of said wheels lying in a plane with the axis of the blank, driving means and mechanism for rotating the blank and for equally and oppositely and in predetermined timed relation to the rotation of the blank swinging the wheels about axes parallel with each other and perpendicular to the said plane, and means for simultaneously rotating the cutting wheels about their own axes.

10. A machine of the character described, comprising means for rotatably supporting a blank, twin cutter-heads mounted to turn about parallel axes to one side of the axis of the blank and perpendicular to the plane thereof, circular-cutting wheels on said cutter-heads having their axes in the same plane with the axis of the blank, driving means and timed gearings for rotating the blank and turning the cutter-heads, and means for rotating the cutting wheels.

11. A machine of the character described, comprising means for rotatably supporting a blank, twin cutter-heads mounted to turn about parallel axes to one side of the axis of the blank and perpendicular to the plane thereof, circular-cutting wheels on said cutter-heads having their axes in the same plane with the axis of the blank, means for rotating the blank, mechanism for turning the cutter-heads equally and oppositely and in predetermined timed relation to the rotation of the blank, and means for rapidly rotating the cutting wheels.

12. A machine of the character described, comprising a rotatable blank support, twin cutter-heads mounted to turn about parallel axes to one side of the axis of the blank and perpendicular to the plane thereof, circular-cutting wheels mounted on said heads in diametrical alinement with the axes of said heads, driving means and timed gearings for rotating the blank and turning the cutter-heads, and a gearing for also rapidly rotating the cutting wheels.

13. A machine of the character described, comprising means for rotatably supporting a blank, twin circular-cutting wheels arranged at one side of the axis of the blank to act in shifting planes intersecting said axis with the blank between them, the cutting regions of said wheels being transversely of buttress outline, driving means and timed connections for rotating the blank and for swinging the cutting wheels at equal relatively slow speed about axes parallel with each other and to one side of the axis of the blank and perpendicular to a plane thereof, and means for rapidly rotating the wheels.

14. A machine of the character described, comprising means for rotatably supporting a blank, twin cutter-heads rotatable about parallel axes to one side of the axis of the blank and perpendicular to a plane thereof, circular-cutting wheels mounted on the heads to rotate upon axes transverse to the axes of the heads, common driving means, mechanism for rotating the blank and mechanism for relatively slowly turning the cutter-heads in predetermined timed relation, means for stopping, starting and reversing the movement of the cutter-heads, and means for rapidly rotating the cutting wheels.

15. A machine of the character described, comprising means for rotatably supporting a blank, twin cutter-heads rotatable about parallel axes to one side of the axis of the blank and perpendicular to a plane thereof, circular-cutting wheels mounted on the heads to rotate upon axes transverse to the axes of the heads, common driving means, mechanism for rotating the blank and mechanism for relatively slowly turning the cutter-heads in predetermined timed relation, the mechanism for turning the cutter-heads including pinions connected with the cutter-heads and a multiple rack meshing between said pinions, and means for rapidly rotating the cutting wheels.

16. A machine of the character described, comprising means for rotatably supporting a blank, twin cutter-heads rotatable about parallel axes to one side of the axis of the blank and perpendicular to the plane thereof, circular-cutting wheels mounted on the heads to rotate upon axes transverse to the axes of the heads, common driving means, mechanism for rotating the blank and mechanism for relatively slowly turning the cutter-heads in predetermined timed relation, the mechanism for turning the cutter-heads including pinions connected with the cutter-heads and a multiple rack meshing between said pinions, means for reversing the movement of said rack, and means for rapidly rotating the cutting wheels.

17. A machine of the character described, comprising a frame, means thereon for rotatably supporting a blank, twin cutter-heads mounted on the frame to turn on parallel axes to one side of the axis of the blank and perpendicular to the plane thereof, circular-cutting wheels mounted on said heads to revolve on axes transverse to the axes of the heads to operate upon the blank betwen them, common driving means on the frame, a train of timed connections for rotating the blank, another train of timed connections for turning the cutter-heads, and another branched train of connections partly on the frame and partly on the cutter-heads for rotating the cutting wheels on the turning heads.

18. A machine of the character described, comprising means for rotatably supporting a blank, a circular-cutting wheel having its axis in a plane with the axis of the blank, mechanism for rotating the blank and for relatively slowly swinging the cutting wheel about an axis perpendicular to said plane in predetermined timed relation, and means for rapidly rotating the cutting wheel about its axis as it is swung.

19. A machine of the character described, comprising means for rotatably supporting a blank, a circular-cutting wheel having its axis in a plane with the axis of the blank, mechanism for rotating the blank and for relatively slowly swinging the cutting wheel about its diameter perpendicular to said plane in predetermined timed relation, and means for rapidly rotating the cutting wheel about its axis as it is swung.

20. A machine of the character described, comprising means for rotatably supporting a blank, a cutter-head rotatable about an axis to one side of the axis of the blank and perpendicular to a plane thereof, mechanism for rotating the blank and relatively slowly turning the cutter-head, a circular-cutting wheel on the cutter-head arranged to act in planes intersecting the axis of the blank and substantially perpendicular to the plane of said axis which is perpendicular to the axis of the cutter-head, and means for rotating the cutting wheel on the turning head.

21. A machine of the character described, comprising means for rotatably supporting a blank, a cutter-head rotatable about an axis to one side of the axis of the blank and perpendicular to a plane thereof, driving means and timed gear trains for rotating the blank and relative slowly turning the cutter-head, a circular-cutting wheel on the cutter-head having its axis in substantially right-angular relation to the axis of rotation of the head and therefore acting always in planes substantially perpendicular to said axis of the blank, and a train for rapidly rotating the cutting wheel.

22. A machine of the character described, comprising means for rotatably supporting a blank, a circular-cutting wheel the cutting regions of which are of buttress outline transversely of the wheel, said wheel being arranged to act in planes intersecting the axis of the blank and substantially perpendicular to a given plane thereof, a cutter-head mounted to turn about an axis to one side of the axis of the blank and perpendicular to its said plane, mechanism for rotating the blank and relatively slowly turning the cutter-head in predetermined timed relation, and means for simultaneously rotating the cutting wheel.

23. A machine of the character described, comprising means for rotatably supporting a blank, a rotatable cutter-head, a circular-cutting wheel on the head rotatable on an axis transverse to the axis of the head, common driving means, a timed train for rotating the blank, a timed train for relatively slowly turning the cutter-head, a train for rotating the cutting-wheel, and means for reversing the rotation of the cutter-head.

24. In a gear-cutting machine, the combination of means for rotatably supporting a blank, a rotatable cutter-head having its axis to one side of and transverse to the axis of the blank, a circular-cutting wheel on the cutter-head rotatable on an axis transverse to the axis of the head so as to act in planes intersecting the axis of the blank and substantially perpendicular to a given plane of said axis, mechanism for rotating the blank and slowly turning the head in predetermined timed relation, and means for rapidly rotating the cutting wheel.

25. In a gear-cutting machine, the combination of means for supporting and rotating a blank, a rapidly rotating cutter-wheel acting in planes intersecting the axis of the blank and substantially perpendicular to a given plane of said axis, and means for slowly swinging said wheel about an axis to one side of the axis of the blank and perpendicular to said plane thereof so as to displace the cutting region at varying rates transversely and lengthwise with reference thereto.

26. In a gear-cutting machine, the combination of means for rotatably supporting a blank, a rotatable cutter-head, a circular-cutting wheel journaled on a transverse axis on the cutter-head, timed mechanisms for rotating the blank and slowly turning the cutter-head through an arc of movement, means for rapidly rotating the cutting wheel on the turning head, and means for starting and stopping the cutter-head and for rapidly turning the same backward.

27. In a gear-cutting machine, the combination of means for rotatably supporting a blank, a rotatable cutter-head, a rapidly rotating circular-cutting wheel journaled on a transverse axis on the cutter-head, driving means and timed trains driven thereby for rotating the blank and slowly turning the cutter-head through an arc of movement, and reversing mechanism having a low speed forward and high speed reverse ratio.

28. In a gear-cutting machine, the combination of a frame, means for supporting and rotating a blank, twin cutter-heads, means for turning the same in opposite directions, cutting wheels on said heads, and mechanism for driving said cutting wheels comprising a train on the frame of the machine terminating in oppositely rotating driving elements coaxial with the cutter-heads, and gearings on the heads driven at equal speeds by said elements for rotating the cutting wheels.

29. In a gear-cutting machine, a rotatable cutter-head, a cutter-wheel on the head mounted to rotate about an axis transverse to the axis of rotation of the head, gearing on the head connected with the wheel and terminating in a driven element eccentric to the axis of the head, a driving element coaxial with the head meshing with said driven element, and means for rotating said head and said driving element in definite ratio.

30. In a gear-cutting machine, a rotatable cutter-head, a cutter-wheel on the head mounted to rotate about an axis transverse to the axis of rotation of the head, a vertical shaft on the cutter-head eccentric to the axis of rotation thereof, said shaft being geared to the cutter-wheel to drive the same and having a pinion on its upper end, an internal gear cap over the head and coaxial therewith in driving engagement with said pinion, and means for rotating the head and cap in definite ratio.

JOHN C. KOPF.